United States Patent Office 3,646,154
Patented Feb. 29, 1972

3,646,154
HOT MELT ADHESIVE CONTAINING POLY-
AMIDE AND ETHYLENE-VINYL ACETATE
COPOLYMER
Nelson S. Marans and Victor S. Frank, Silver Spring,
Md., assignors to W. R. Grace & Co.
No Drawing. Filed Feb. 2, 1970, Ser. No. 8,096
Int. Cl. C08g 41/04
U.S. Cl. 260—857 L                                    8 Claims

ABSTRACT OF THE DISCLOSURE

This invention relates to a hot melt adhesive resin composition which can be set by heat and pressure to bond to solid surfaces. The adhesive composition consists essentially of an ethylene-containing polar copolymer or terpolymer in combination with 10–60% by weight of the composition of a polyamide which is the reaction product of an alkylene or arylene polyamine of the formula:

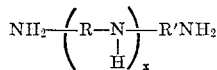

wherein R and R' are alkylene, arylalkylene and arylene and $x$ is 0 to 3, and an alkylene dicarboxylic acid or its esters. The adhesive can be used to bond metal, ceramic, leather, paper, wood, plastic and other surfaces.

---

Hot-metal adhesive resins are thermoplastic solids that are applied in the molten state and which solidify and bond on cooling. Hot-melt adhesives are employed in applications where fast bonding is essential. Since the bond is formed by cooling, the speed of using these adhesives is dependent upon how fast the adhesive can be melted and thereafter cooled to a temperature at which a bond is formed.

One type of conventional hot-melt adhesive used today is an ethylene-containing polar copolymer or terpolymer, e.g., ethylene-vinyl acetate. This type of adhesive however has the drawback that the composition has a high viscosity which does not allow it to flow fast enough for use on continuous high speed line operations. Wax is usually added as a flow modifier but such an addition because of its lower molecular weight and lack of polarity lowers both the cohesive and adhesive properties of the resulting bond.

The polyamides of the instant invention although having excellent flow and adhesive properties by themselves, have the drawback of high cost.

One object of the instant invention is to produce a hot-melt adhesive with improved adhesive properties. Another object of the present invention is to produce a hot-melt adhesive with improved flow properties acceptable for use on continuous high speed line operations. Still another object is to produce a hot-melt adhesive composition which is low enough melting as to be storable without degradation of the polyamide in the composition.

Yet another object of the instant invention is to produce a hot-melt adhesive which because of its high molecular weight and increased polarity yields an adhesive with improved flow properties and greater cohesive and adhesive bonding properties. Other objects will become apparent from a reading hereinafter.

Summarily, these and other objects are accomplished in the instant invention by forming a hot-melt adhesive composition consisting essentially of an ethylene-containing polar copolymer or terpolymer in combination with 10–60% by weight of the composition of a polyamide which is the reaction product of an alkylene or arylene polyamine of the formula:

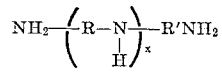

wherein R and R' are alkylene, arylalkylene and arylene and $x$ is 0 to 3, and an alkylene dicarboxylic acid or its esters. In a preferred embodiment of the invention, the dicarboxylic acid or its esters is an imino compound having the structure

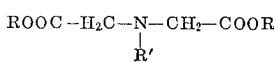

wherein R' is hydrogen, alkyl, alkaryl, aralkyl,

—CH$_2$CH$_2$CN or —CH$_2$CONH$_2$ and R is hydrogen or alkyl having from 1 to 6 carbon atoms. The adhesive can be used to bond metal, ceramic, leather, paper, wood, plastic and other surfaces.

The preparation of the preferred polyamides of the instant invention is set out in a copending application having Ser. No. 828,371 filed May 27, 1969 now abandoned and assigned to the same assignee. Broadly, the alkyl amine and the imino diacid or imino diester are reacted in the presence of water in a closed pressure vessel at a temperature from about 100–200° C., the temperature being controlled by an external bath. Upon substantial completion of the reaction, the temperature is maintained in the range of about 100° C. to about 200° C. and a vacuum is applied. Heat and vacuum are continued until the resin is desolvated. The resin is then usually ground to a powder form for adhesive use. The reaction temperature in producing the resin can vary outside the preferred range of 100–200° C., however, at lower temperatures the rate of reaction is slow and at temperatures much above 200° C. there is the problem of reactive degradation. In regard to the reactant ratios, stoichiometry requires equimolar amounts. However, it is preferred to use a slight excess of the amine in order to drive the reaction more readily to completion. Mixtures of the alkyl amine and/or the imino diacids and imino diesters can also be employed in forming the polyamide. Thus by being able to use mixtures of the reactants the properties desired of the adhesive by the user can be accommodated. Preparation of these preferred polyamides will be shown by examples hereinafter.

In employing the composition of the instant invention as an adhesive the composition is placed in a press and heated to from about 50 to about 180° C. to melt the adhesive. The adhesive is applied to the substrate which in itself is usually heated and a second substrate is placed thereon forming an overlap. A pressure from about 5 p.s.i. to about 10,000 p.s.i. is applied to produce a bonded composite. The temperature to which the composite is heated may be anywhere between the melting point and the decomposition point of the adhesive as long as there is no deterioration of the surfaces to be bonded. A temperature in the range of from about 50 to about 180° C. is preferred. The pressure applied depends on the fragility of the composite and the strength of bond desired. When the surfaces are aluminum, the pressure may be 8,000 p.s.i. or more while, with glass, generally a pressure of about 10 p.s.i. is employed. The pressure to be used will thus vary with the application.

In regard to the bonding technique, the adhesive composition is generally placed on one surface and a second surface is overlaid to produce either a symmetrical or off-set composite. The surfaces are usually pre-heated, the resin applied as a melt or as a solid which is melted on the substrate, heating is continued and pressure is applied to produce a bond. The resulting bonds are noted for their high strength characteristic.

The following examples are set out to further amplify the present invention.

PREPARATION OF PREFERRED POLYAMIDES.—
EXAMPLE 1

A pressure reaction vessel equipped with an external oil bath, and 2 stop cock controlled openings which can be used for flowing a gas stream through the vessel or for vacuum is assembled. The vessel is charged with 17.1 grams of the dimethylester of iminodiacetic acid, 12.6 grams of 1,6-hexanediamine and 20 grams of water and is heated at about 140° C. for 19 hours. The heating is continued 140° C. and a vacuum applied (8 mm. of Hg) for 4.5 hours. The resulting product is a solid resin, has a melting point of 170° C. and will be referred to herein as Polyamide A.

EXAMPLE 2

The reaction vessel of Example 1 is charged with 6.7 grams of iminodiacetic acid, 5.5 grams of diethylenetriamine, and 10 grams of water and heated to 140° C. for 19 hours. The vessel temperature is reduced to 80° C. and a vacuum applied (25 mm. of Hg) in order to desolvate the final polymer. The polymer formed has a softening point at about 80° C. and will be referred to herein as Polyamide B.

EXAMPLE 3

The pressure vessel of Example 1 is charged with 6.7 grams of iminodiacetic acid, 2.6 grams of diethylenetriamine, 1.6 grams of ethylenediamine, and 10 grams of water. The vessel is heated to 170° C. for 16 hours. The temperature of the vessel is reduced to 80° C. and a vacuum (25 mm. of Hg) is applied to desolvate the polymer formed. The final polymer has a softening point at about 110° C. and will be referred to herein as Polyamide C.

EXAMPLE 4

The pressure of Example 1 is charged with 13.3 grams of iminodiacetic acid, 12.0 grams of 1,6-hexanediamine and 8 grams of water. The vessel is heated to 175° C. for 16 hours. The vessel temperature is then reduced to 150° C. and a vacuum applied (10 mm. of Hg) to desolvate the polymer formed. The final polymer has a softening point at about 165° C. and will be referred to herein as Polyamide D.

EXAMPLE 5

The pressure vessel of Example 1 is charged with 10.3 grams of diethylenetriamine, 18.7 grams of cyanoethyliminodiacetic acid and 10 grams of water. The vessel is heated to 150° C. for 5 hours. The vessel is maintained at 150° C. and a vacuum of 5 mm. of Hg is applied. The polymer formed has a softening point at about 60° C. and will be referred to herein as Polyamide E.

EXAMPLE 6

The pressure vessel of Example 1 is charged with 19.0 grams of acetamidoiminodiacetic acid, 13.0 grams of 1,6-hexanediamine and 20 grams of water. The vessel is heated to 170° C. for 16 hours. The temperature is then decreased to 90° C. and a vacuum of 25 mm. of Hg is applied. The final polymer has a softening point at about 160° C. and will be referred to herein as Polyamide F.

EXAMPLE 7

A pressure reaction vessel, equipped with an external oil bath, and 2 stop cock controlled openings which can be used for flowing a gas stream through the vessel or for vacuum, is assembled. The vessel is charged with 20.3 grams n-propyliminodiacetic acid dimethyl ester, 11.6 grams of 1,6-hexanediamine and 20 grams of water and is heated at about 140° for 20 hours. The heating is continued at 140° C. and a vacuum applied (8 mm. of Hg) for 5 hours. The resultant product is a solid resin and will be referred to herein as Polyamide G.

ADHESION EXAMPLES.—EXAMPLE 8

4.08 grams of a commercially available ethylene-vinyl acetate copolymer containing 28 weight percent vinyl acetate and 0.92 gram of Polyamide A from Example 1 supra were admixed together and heated to 170° C. 0.02 gram of the admixed adhesive resin was placed on on end of a 3" x 1" x 1/16" aluminum strip and another aluminum strip was placed thereover to give a 1" overlap. The overlapping composite was placed in a Pasadena press and heated at 170° C. for 1 minute. Heating was continued and 6,000 p.s.i. of pressure was applied for 1 minute. The composite was removed from the press and cooled for 30 minutes. The bond did not fail during subsequent tension and flexing tests.

Using the same procedure, a control sample consisting of an adhesive of the ethylene-vinyl acetate copolymer per se resulted in almost immediate rupture on the tension and flexing tests.

EXAMPLE 9

1.75 grams of a commercially available ethylene-vinyl acetate copolymer containing 28 weight percent vinyl acetate and 1.46 grams of Polyamide A from Example 1 were admixed together and heated to 170° C. 0.02 gram of the admixed adhesive resin were placed on one end of an aluminum strip (3" x 1" x 1/16") and another aluminum strip of the same dimensions was placed on top of the adhesive to give a 1" overlap. The composite strips were placed in a Pasadena press and heated to 170° C. for a 1 minute preheating period. Heating was continued and 6,000 p.s.i. of pressure was applied to the strips for 1 minute. The strips were removed from the press and cooled for 30 minutes. The bond did not fail during subsequent tension and flexing tests.

EXAMPLE 10

Example 8 was repeated except that 0.92 gram of Polyamide B from Example 2 was substituted for the Polyamide A. The resulting bond did not fail when subjected to tension and flexing tests.

EXAMPLE 11

Example 8 was repeated except that 0.92 gram of Polyamide C from Example 3 was substituted for Polyamide A. The bond did nto fail during subsequent tension and flexing tests.

EXAMPLE 12

Example 8 was repeated except that 0.92 gram of Polyamide D from Example 4 was substituted for Polyamide A. The bond did not fail during subsequent tension and flexing tests.

EXAMPLE 13

Example 8 was repeated except that 0.92 gram of Polyamide E from Example 5 was substituted for Polyamide A. The bond did not fail during subsequent tension and flexing tests.

EXAMPLE 14

Example 9 was repeated except that 1.46 grams of Polyamide F from Example 6 was substituted for Polyamide A. The bond did not fail during subsequent tension and flexing tests.

EXAMPLE 15

Example 9 was repeated except that 1.46 grams of Polyamide G from Example 7 was substituted for Polyamide A. The bond did not fail during subsequent tension and flexing tests.

EXAMPLE 16

Sufficient Polyamide A was admixed with a commercially available hot melt adhesive sold under the trade name "Verr 2" by Union Carbide Co., consisting of a commercially available vinyl chloride-vinyl alcohol terpolymer with about 1% of an oxirane oxygen (78% vinyl chloride) having a flow temperature 100–115° C., to give an admixture containing 27% Polyamide A. The admixture was heated to 135° and placed on one end of an aluminum strip (3″ x 1″ x 1/16″) and another aluminum strip of the same dimension was placed thereover to give an overlap of 1″. The aluminum strips were placed in a Pasadena press and heated to 135° for a 1 minute preheating period. Heating was continued and 6,000 p.s.i. of pressure was applied for 1 minute. The strips were removed and cooled for 30 minutes. The bond did not fail during subsequent tension and flexing tests.

EXAMPLE 17

Example 16 was repeated except that sufficient Polyamide A was admixed with "Verr 2" to give a polyamide content of 56% by weight. The admixture was heated to 135° C. and placed on one end of an aluminum strip (3″ x 1″ x 1/16″) and another aluminum strip of the same dimensions was placed thereon to give an overlap of 1″. The strips were placed in a Pasadena press, pre-heated for 1 minute and then subjected to 6,000 p.s.i. pressure for 1 minute at 135° C. The strips were removed from the press and cooled for 30 minutes. The resultant bond did not fail during subsequent tension and flexing tests. A control run using the same procedure except that the adhesive was "Verr 2" per se without any polyamide resulted in a negligible bond that failed almost immediately during a subsequent tension and flexing test.

EXAMPLE 18

5.0 g. of Elvax 150, a commercially available polyethylene-vinyl acetate copolymer containing 33 weight percent vinyl acetate, was used under the conditions of Example 8 and the bond failed readily on flexing. In contrast a blend of 50% by weight of Elvax 150 and 50% of Emery Resin 3796R a commercially available polyamide formed from a dimer of an unsaturated fatty acid and a diamine having a softening point of 108° C., an acid value of 3.1 as measured by ASTMD–1980–61 and an amine value of 0.7 as measured by ASTMD–2074–65T under the same conditions gave a bond that broke only under continued flexing and tension. In addition, the homogeneous mixture could be used at a press temperature of 130° C. where the Elvax 150 was unable to flow at this low temperature.

EXAMPLE 19

Elvax 150, 84.2% by weight, and Emery Polyamide Resin 3796R, 15.8% by weight were melted to give a homogeneous mixture and the bonding method of Example 8 repeated. The bond that formed was strong and flexure to 90° angle was required under considerable tension before bond failure occurred. Under the identical conditions, a composition with 100% Emery Resin 3796R failed rapidly.

EXAMPLE 20

65.7% by weight of a vinyl chloride-vinyl alcohol terpolymer containing 2.1% maleic acid (81% by weight vinyl chloride) commercially available from Union Carbide under the trade name "VMCA" resin was admixed with 34.3% by weight of Emery Polyamide Resin 3796R and employed as an adhesive using the procedure of Example 8. A strong bond was formed and only broke after considerable flexing and tension. The same example using the "VMCA" resin alone as a control gave immediate bond breaking.

EXAMPLE 21

Example 20 was repeated except that the adhesive contained 82.3% by weight "VMCA" resin and 17.7 weight percent Emery Polyamide Resin 3796R. A strong bond was formed which was slightly inferior to the adhesive composition of Example 20 but greatly superior to "VMCA" resin alone.

EXAMPLE 22

54.3% by weight of an ethylene-containing polar copolymer sold under the trade name "Verr 2" by Union Carbide and 45.7 weight percent of Emery Polyamide Resin 3796R was used as an adhesive under the conditions and procedure of Example 8 to give a strong bond but somewhat inferior to the bond formed in Example 21. A control run forming a bond of "Verr 2" per se was extremely weak and failed immediately.

EXAMPLE 23

An adhesive composition consisting of 87.4% by weight of "Verr 2" and 12.6% by weight of Emery Polyamide Resin 3796R employed under the conditions and procedure of Example 8 gave a very weak bond, only slightly superior to "Verr 2" alone.

EXAMPLE 24

A laminated sandwich was made up comprising a 10 mil thick piece of aluminum, a 5 mil thick piece of bond paper, a 5 mil thick polyvinyl chloride film, a 1/16″ thick piece of leather, a 1/4″ thick piece of neoprene, a 1/4″ thick piece of plywood and a 1/32″ thick piece of steel from top to bottom respectively. Each layer in the sandwich was coated with a 1 mil thick layer of the adhesive composition of Example 9. The sandwich was put in a Carver press, heated at 80° C. for 1 minute and then subjected to 1000 p.s.i. pressure for 1 minute. The laminated sandwich was removed and cooled for 30 minutes. The resultant bond was good between all the layers.

EXAMPLE 25

The reaction vessel of Example 7 is charged with 13.3 grams of iminodiacetic acid, 25 grams of water and 10.6 grams of p-phenylenediamine and the reaction mixture is heated for 24 hours at 140° C. and then under a vacuum of 0.1 mm. Hg for an additional 8 hours at 140° C. The product had a softening point of 150° C. and will be referred to herein as Polyamide H.

EXAMPLE 26

Example 8 was repeated except that 1.2 g. of Polyamide H from Example 25 was substituted for Polyamide A. The bond did not fail during subsequent tension and flexing tests.

The conventional ethylene-containing polar copolymer and terpolymers used in combination with the polyamides of this invention as hot melt adhesives are varied and well known to those skilled in the art. Such copolymers and terpolymers include, but are not limited to, ethylene-vinyl acetate, ethylene-alkyl acrylate, ethylene-alkyl methacrylate, ethylene-hydroxyalkyl acrylate, ethylene-hydroxyalkyl methacrylate, ethylene-maleic anhydride, ethylene-butadiene, ethylene-vinyl acetate-acrylic or methacrylic acid, ethylene-butadiene-acrylic acid and the like.

What is claimed is:

1. A hot-melt adhesive resin composition consisting essentially of an ethylene vinyl acetate copolymer and 10–60% by weight of said composition of a polyamide which is the reaction product of an alkylene or arylene polyamine and an imino compound having the structure

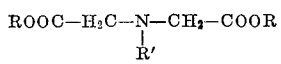

wherein R' is hydrogen, alkyl, alkaryl, aralkyl,

or —CH₂CONH₂ and R is hydrogen or an alkyl having from 1–6 carbon atoms.

2. The composition according to claim 1 wherein the alkylene polyamine is 1,6-hexanediamine and the imino compound is dimethylester of iminodiacetic acid.

3. The composition according to claim 2 wherein the alkylene polyamine is diethylenetriamine and the imino compound is iminodiacetic acid.

4. The composition according to claim 2 wherein the alkylene polyamine is 1,6-hexanediamine and the imino compound is iminodiacetic acid.

5. The composition according to claim 1 wherein the alkylene polyamine is diethylenetriamine and the imino compound is cyanoethyliminodiacetic acid.

6. The composition according to claim 1 wherein the alkylene polyamine is 1,6-hexanediamine and the imino compound is acetamidoiminodiacetic acid.

7. The composition according to claim 1 wherein the alkylene polyamine is 1,6-hexanediamine and the imino compound is n-propyliminodiacetic acid dimethylester.

8. The composition according to claim 1 wherein the arylene polyamine is p-phenylenediamine and the imino compound is iminodiacetic acid.

References Cited

UNITED STATES PATENTS

| | | | |
|---|---|---|---|
| 3,539,662 | 11/1970 | Hill | 260—857 L |
| 3,548,028 | 12/1970 | Itabashi | 260—857 L |
| 3,274,289 | 9/1966 | Murdock | 260—857 |
| 3,433,853 | 3/1969 | Earle | 260—857 |
| 3,464,940 | 9/1969 | Barton | 260—857 |
| 3,472,916 | 10/1969 | Anspon | 260—857 |
| 3,484,403 | 12/1969 | Brunson | 260—857 |

FOREIGN PATENTS

| | | | |
|---|---|---|---|
| 740,501 | 8/1966 | Canada | 260—857 |
| 1,514,205 | 2/1968 | France | 260—857 |

PAUL LIEBERMAN, Primary Examiner

U.S. Cl. X.R.

156—331; 260—18 N, 23 H, 23 XA, 857 U, 857 D